Jan. 23, 1940.  E. G. DAVIS  2,188,276
CASTING MACHINE
Filed Oct. 13, 1937  9 Sheets-Sheet 6

Inventor
Espy G. Davis
By Stryker & Stryker
Attorneys

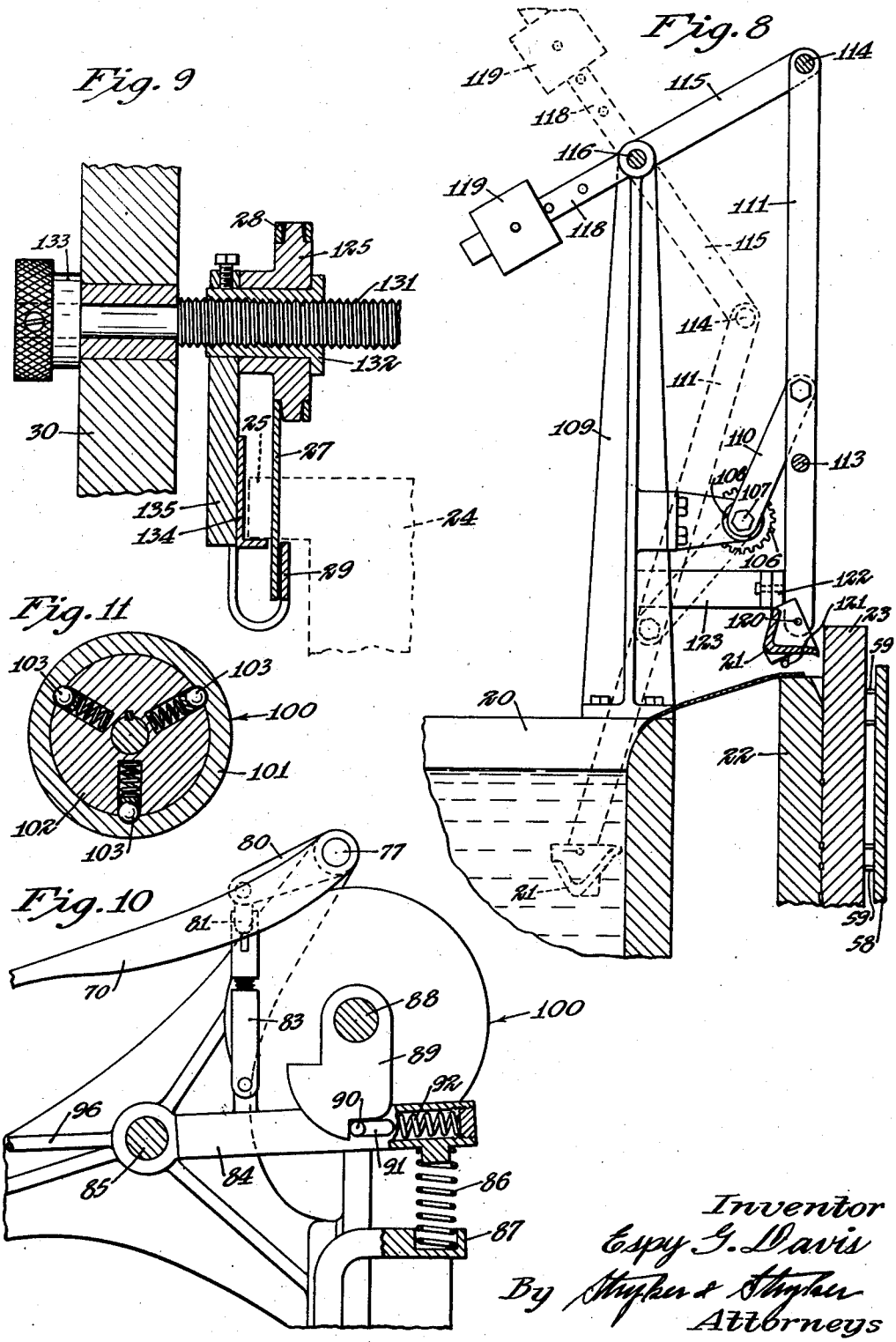

Jan. 23, 1940.  E. G. DAVIS  2,188,276
CASTING MACHINE
Filed Oct. 13, 1937   9 Sheets-Sheet 8
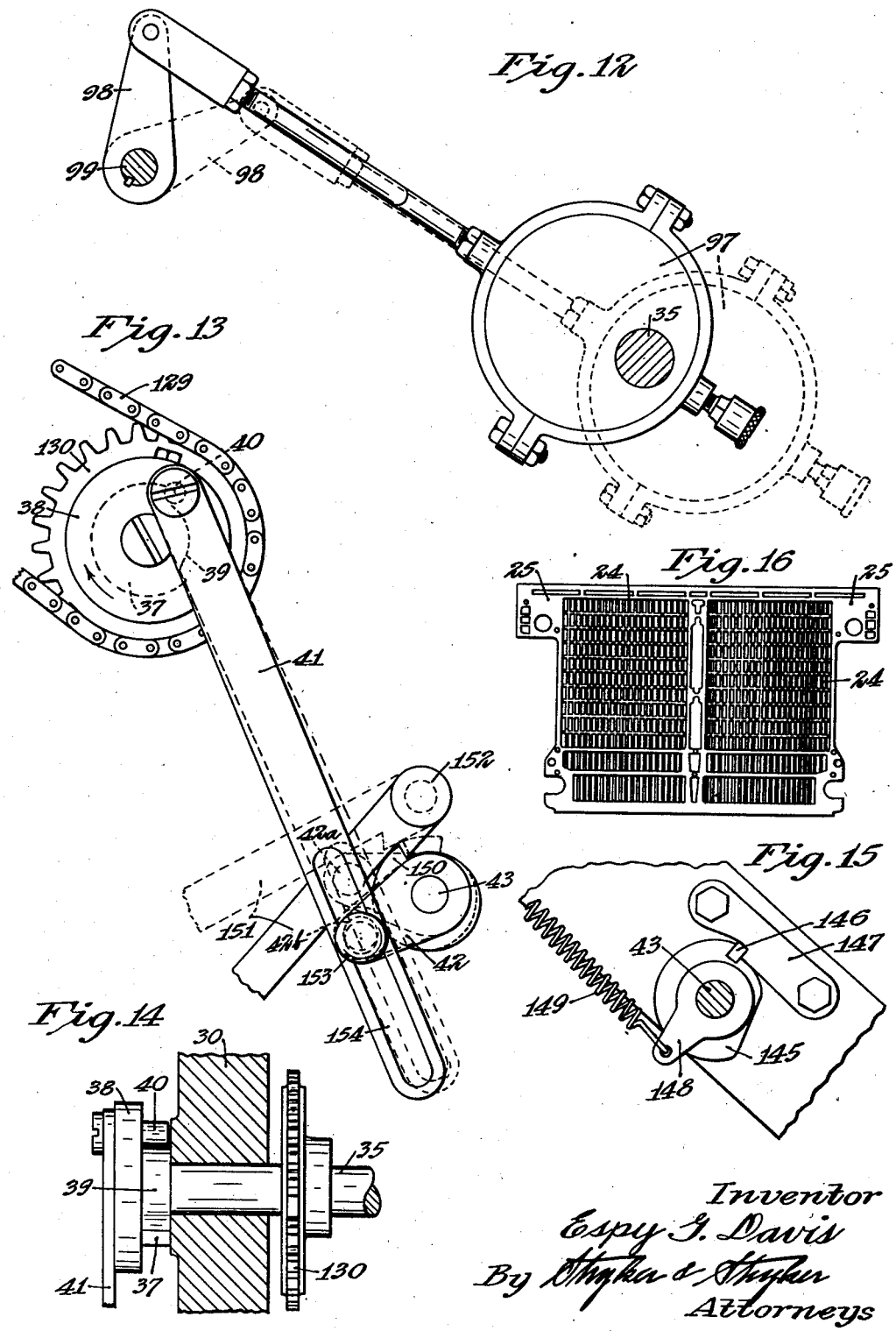

Jan. 23, 1940.  E. G. DAVIS  2,188,276
CASTING MACHINE
Filed Oct. 13, 1937    9 Sheets-Sheet 9
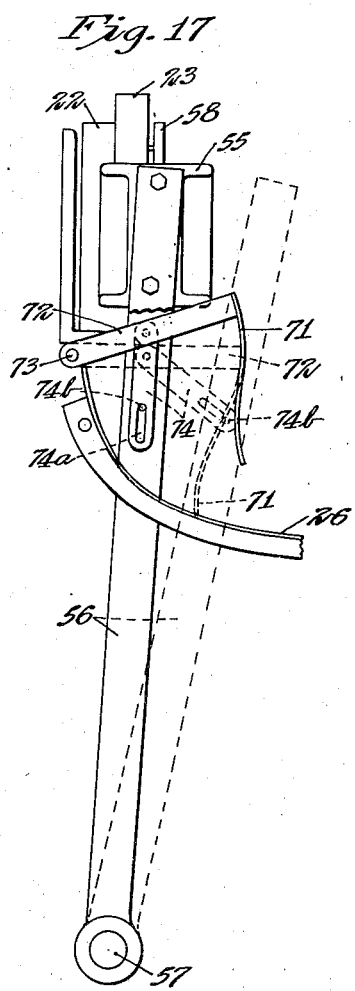
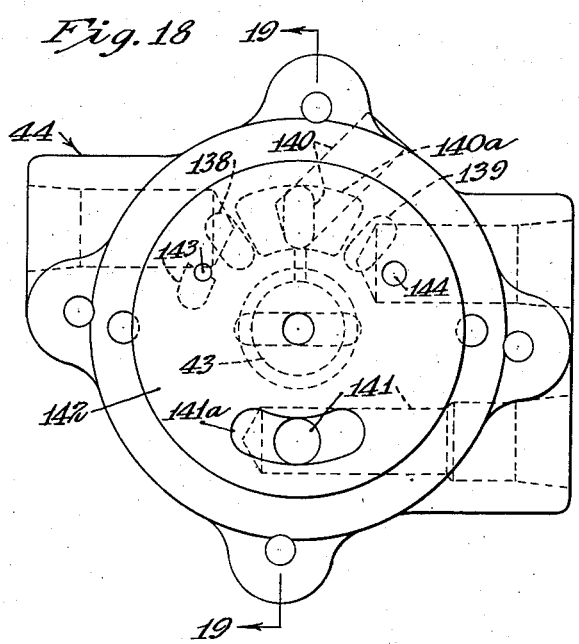
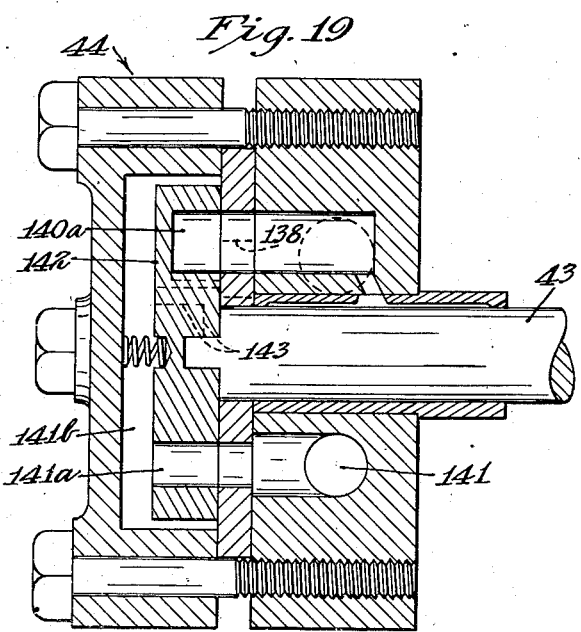
Inventor
Espy G. Davis
By Stryker + Stryker
Attorneys Patented Jan. 23, 1940

2,188,276

UNITED STATES PATENT OFFICE 2,188,276

CASTING MACHINE

Espy G. Davis, St. Paul, Minn., assignor to National Battery Company, a corporation of Delaware Application October 13, 1937, Serial No. 168,761

16 Claims. (Cl. 22—57)

This invention relates to a machine for automatically molding and collecting thin, soft metal castings, such as the grids for storage batteries. The present day demand for small, compact batteries of large capacity has necessitated the use of extremely thin plates and has increased the difficulties attendant upon the casting of the grids on which the active material is pasted or formed. Such grids are very fragile and consist largely of small filaments of metal which adhere to the mold making rapid ejection from the mold and subsequent handling in hot pliable condition difficult. Even with the greatest care in the construction of the casting machine, some of the grids catch in the mold and unless this is detected and operation of the machine stopped quickly, serious delay and occasional damage to the machine result.

The several principal objects of this invention are the following:

1. To increase the rate of operation of a machine of this class by reducing the interval of time consumed in the closing of the mold in each cycle of operation.

2. To promote safety in the operation of the machine by providing mechanism for automatically preventing the pouring of the molten metal when the mold is open and providing controls so located and connected to the pouring and mold operating mechanisms that both may be stopped instantaneously in an emergency.

3. To provide stop mechanism which becomes operative whenever a grid is unduly retarded in the mold to arrest the pouring mechanism until the mold has been cleared of the obstructing grid.

4. To provide a novel device for supplying measured quantities of molten metal to the mold, said device being so constructed and arranged that it retains the advantages of hand pouring from a dipper or ladle while speeding up the operation and securing improved uniformity and accuracy in pouring and better distribution in the mold, as compared to hand pouring and other automatic pouring devices known to me.

5. To provide a casting machine which is adapted to be quickly and easily adjusted to make grids of different sizes, the adjustments including changes in the speed of operation to correspond to variations in the time required for cooling grids of different sizes.

6. To provide mold operating mechanism which has the advantages of rapid operation and secure locking in closed position with relatively gradual closing movement such that the impact of the mold on closing is reduced to a minimum.

7. To provide novel mechanism for carrying the grids away from the mold and collecting them in a group whereby more positive inter-engagement of the mechanism with the grids is secured and interruptions caused by obstructing grids are guarded against.

8. To reduce interruptions in the operation of the machine by providing mechanism for starting the machine automatically in case of delay in the delivery of a grid from the mold to the collecting or conveying mechanism for the grids.

Other objects will appear and be more fully pointed out in the following specification and claims.

The invention will be best understood by reference to the accompanying drawings in which:

Fig. 8 is a part side elevation and part section on a larger scale showing the pouring device and associated parts;

Fig. 9 is a fragmentary vertical section showing details of the grid conveyor;

Fig. 10 is an enlarged, part side elevation and part section showing the stop mechanism for the pouring device;

Fig. 11 is a vertical section through one of the over-load clutches;

Fig. 12 shows the eccentric and crank drive for the pouring mechanism;

Figs. 13, 14 and 15 illustrate details of the valve operating mechanism, the latter being a section taken on the line 15—15 of Fig. 6;

Fig. 16 is a side elevation of one of the castings before trimming;

Fig. 17 is a side view of the mechanism for checking and straightening the grids upon their ejection from the mold;

Fig. 18 is a front elevation of the valve for controlling the mold actuating mechanism, with the cover removed, and Fig. 19 is a central vertical section through the valve and cover, taken on the line 19—19 of Fig. 18.

Figure 1:
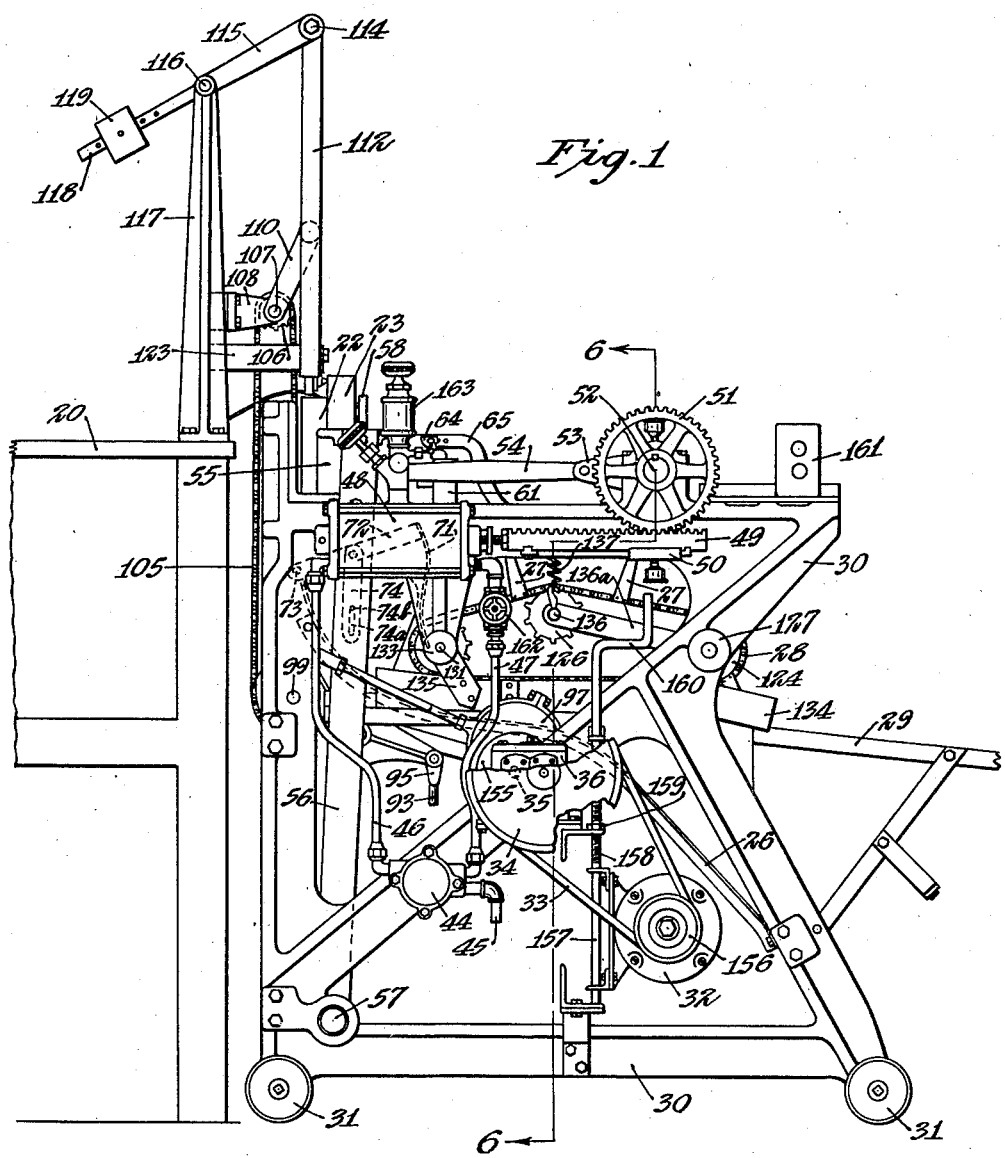
Figure 1 is an elevation of what may be called the back of my improved machine.

Referring to the drawings, a suitable metal for forming the grids or other castings is reduced to molten condition in a furnace of common type having a melting pot 20. Measured quantities of molten metal are carried by a ladle 21 (Fig. 8) and are poured into an opening at the top of a mold comprising a fixed member 22 and a movable member 23. The member 23 is moved to and from closed position by mechanism hereinafter described and during each cycle of operation when the member 23 is in open position a casting, such as that shown in Fig. 16, is ejected from the mold. As shown in Fig. 16, the casting comprises a pair of the grids 24 each of which has a projecting lug 25. When the casting falls from the mold it is inverted so that the lugs 25 project horizontally from the bottom edge. In the normal operation, the casting falls to a chute 26 (Fig. 7) beneath the mold and slides along the chute to a point where the lugs 25 are in the path of a pair of fingers 27 severally secured to conveyor chains 28. These chains operate in the direction indicated by the arrow in Fig. 7 and the fingers 27 slide the lugs 25 along a pair of rails 29. The conveyor chains 28 are continuously operated to collect the castings in such position that they are suspended from their lugs, as indicated in dotted lines at the right of Fig. 7, the rear or trailing edges of the grids being guided along the smooth surface of the chute 26. The operating mechanism for the ladle 21 is preferably mounted on the melting pot 20 and the several mechanisms for operating the mold and grid conveyor and the controls therefor are mounted on a separate frame indicated generally by the numeral 30, this frame being readily removable from the melting pot to facilitate access to the mechanisms while separated from the heat of the furnace. The frame 30 is preferably mounted on wheels 31 to facilitate movement.

Mold operating mechanism

Figure 2:
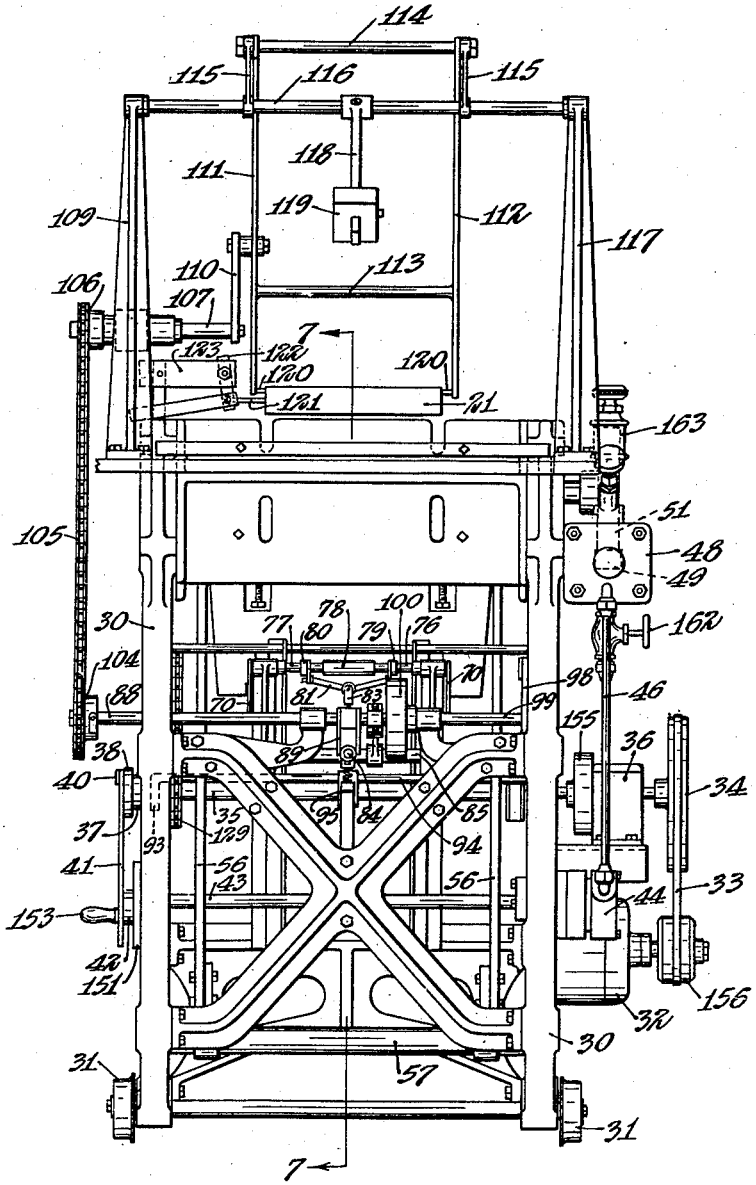
Fig. 2 is an elevation of the mold side of the same.
Figure 3:
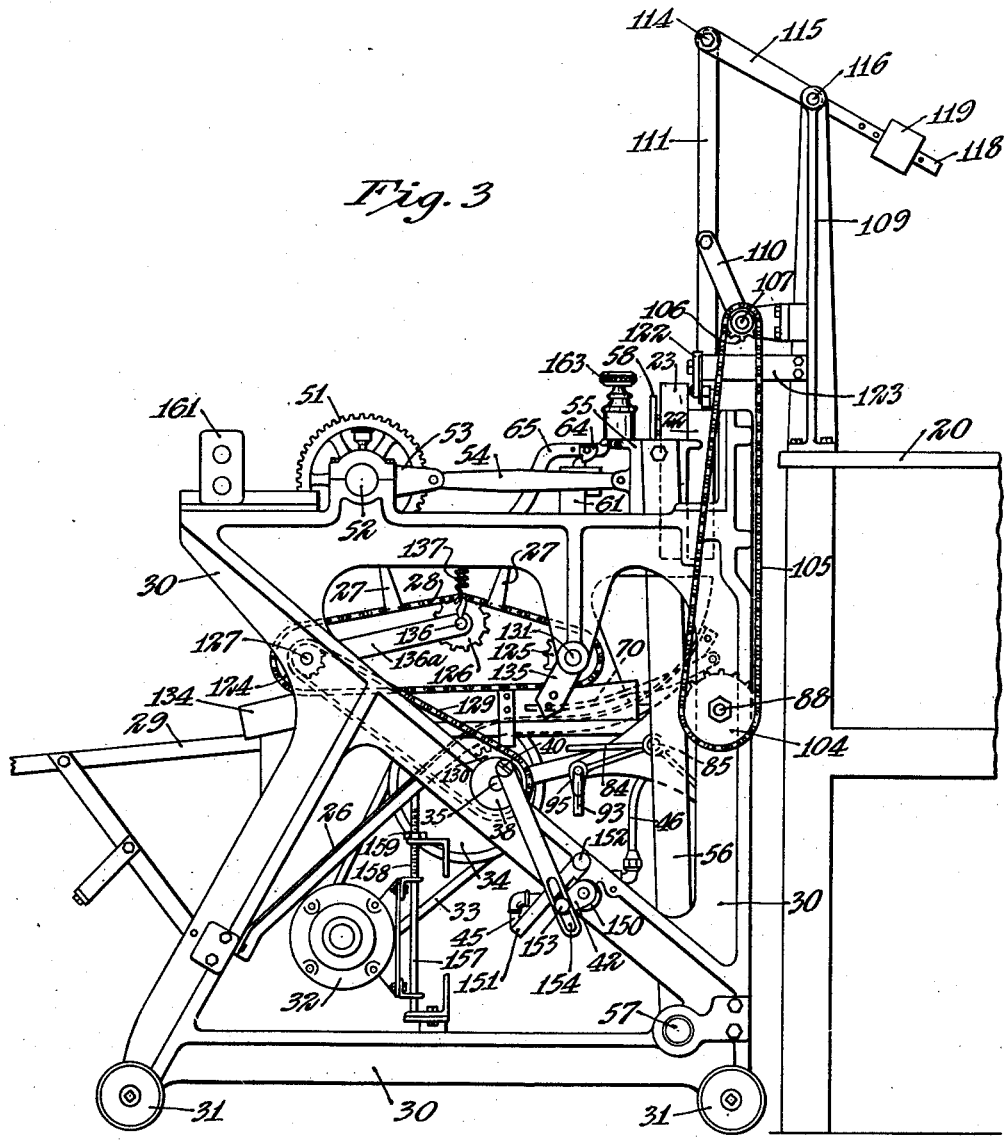
Fig. 3 is an elevation of the front or control side.
Figure 4:
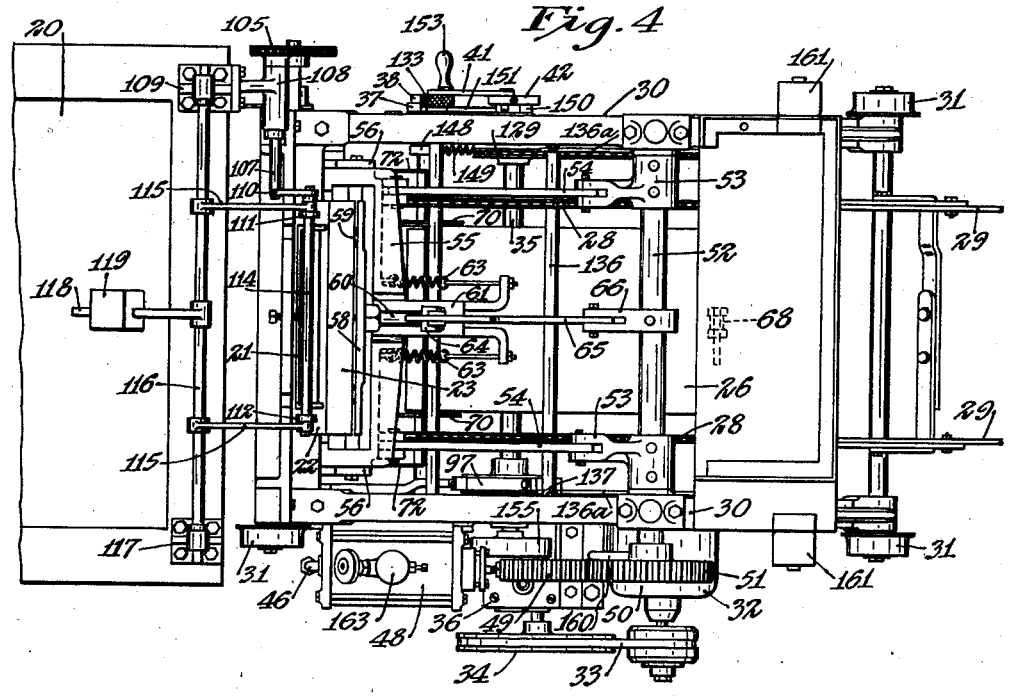
Fig. 4 is a plan view of the machine.

An electric motor 32 is mounted on the frame 30 and drives a belt 33 trained on a pulley 34 (Figs. 1, 2 and 4). The latter is secured to a shaft which is operatively connected to a shaft 35 through suitable speed reducing mechanism in a housing 36. The shaft 35 extends across the frame 30 having a suitable bearing at the control side of the machine. As best shown in Figs. 3, 13 and 14 the shaft 35 has fixed on its end at the outer face of this bearing a head 37. Mounted on the outer face of the head 37 is a disk 38 which is free for limited rotary movement relative to the head 37 as more fully described hereinafter under the caption "Controls and operation". Fixed on the disk 38 and projecting into a peripheral recess 39 in the head 37 is a pin 40 adapted to transmit rotary motion from said head to said disk. A valve operating link 41 has one end pivotally connected to the disk 38 and the other end joined to a short crank 42 fixed on a valve shaft 43. Oscillating movement is imparted to this valve shaft and controls therefor are provided as hereinafter described. The shaft 43 extends to the back of the machine to operate a valve 44 adapted to be supplied with air or other fluid under pressure from a pipe 45. The valve is also connected by pipes 46 and 47 to opposite ends of a cylinder 48. This cylinder is fixed on the frame 30 in horizontal position and has a piston connected to a toothed rack 49 mounted for horizontal reciprocating movement on a guide or way 50. The teeth of the rack 49 mesh with the teeth of a gear 51 secured to a horizontal shaft 52 mounted in bearings on the frame 30. As best shown in Figs. 1 and 4, cranks 53 are secured to the shaft 52 and connected by arms 54 to a mold carriage 55. This carriage has the mold member 23 removably secured thereto and is supported on a pair of arms 56 having pivotal supports 57 near the bottom of the frame 30 (Figs. 1 and 6).

Grid ejecting mechanism

Figure 6:
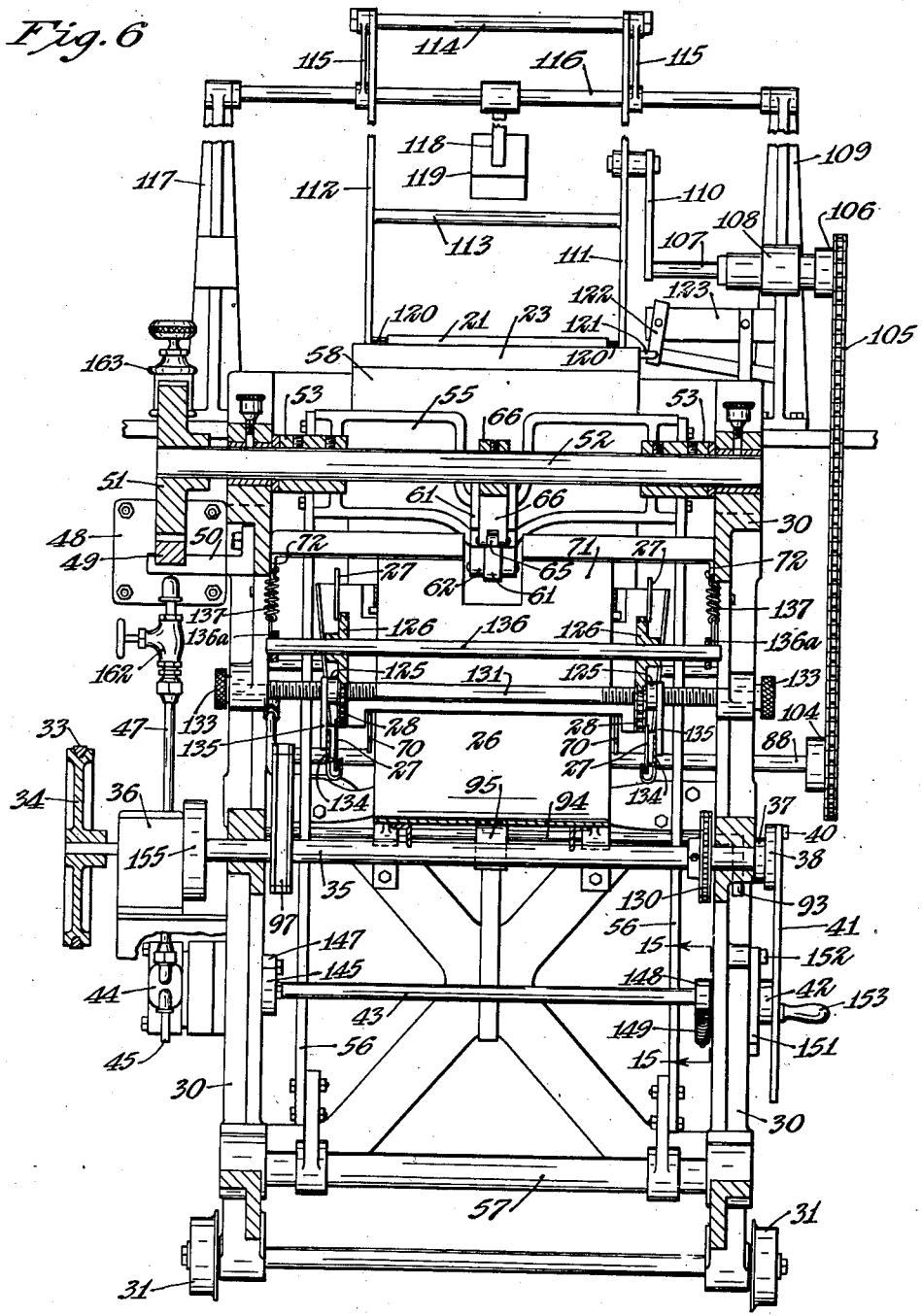
Fig. 6 is a section taken on the line 6—6 of Fig. 1.
Figure 7:
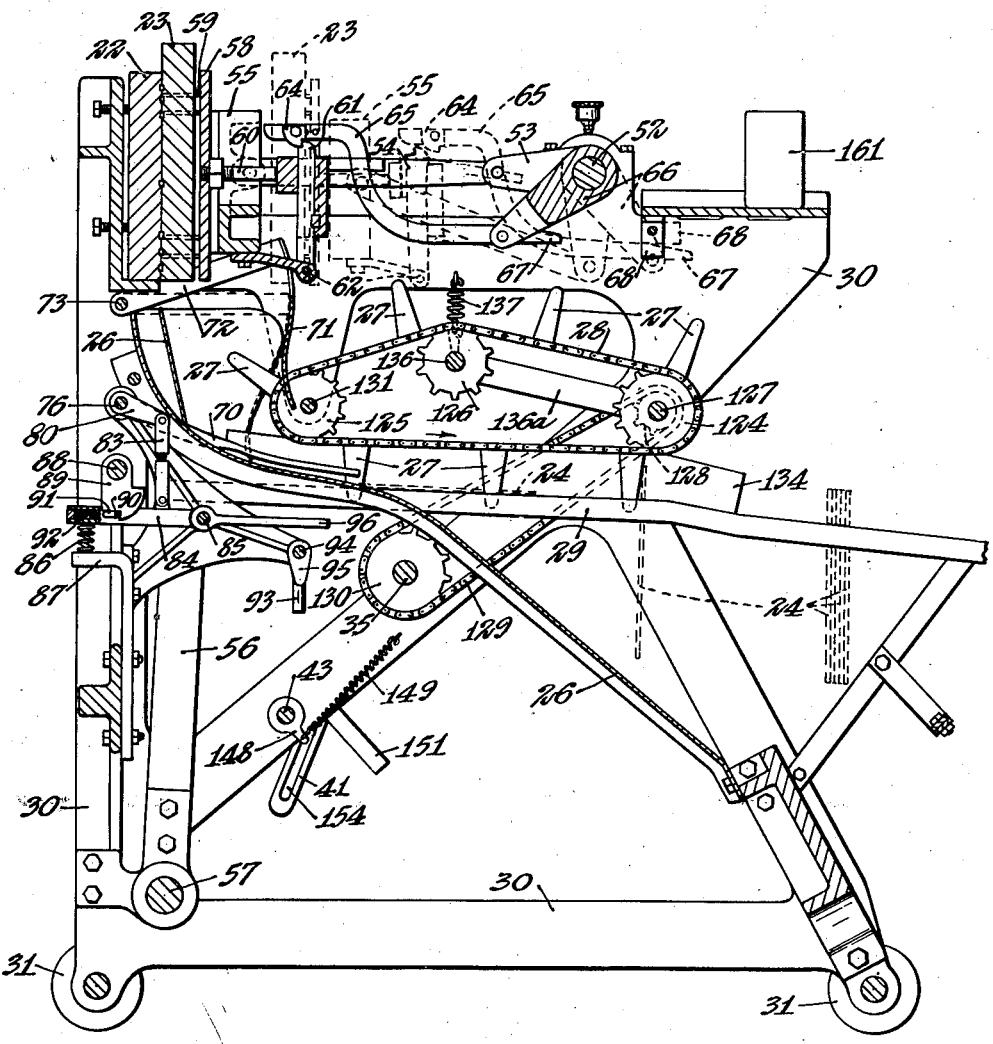
Fig. 7 is a section taken on the line 7—7 of Fig. 2.

As best shown in Figs. 4, 6 and 7, the movable mold member 23 has mounted in spaced, parallel relation to its outer face a plate 58 from which a multiplicity of small pins 59 project into and through the member 23 to engage the castings and remove them from the mold when the latter is open. The pins 59 are freely slidable in their bearings in the member 23 and are secured at their outer ends to the plate 58. A stud 60 is secured centrally to the plate 58 and projects from the back of the mold carriage 55 to be struck by a hammer 61. This hammer is pivotally supported on a small bracket 62 fastened to the bottom of the carriage 55 and is urged toward the stud 60 by springs 63 as shown in Fig. 4. To operate the hammer 61 against the tension of the springs 63, I provide a dog 64 mounted on an end of an arm 65. One end of the arm 65 is pivotally joined to a crank 66 fixed on the shaft 52 in such manner that the point of connection with the crank moves in an arc of greater radius than the points of connection of the mold operating arms 54 with the cranks 53. In this manner the dog 64 on the arm 65 is caused to oscillate with somewhat greater amplitude than the carriage 55. An end 67 of the arm 65 projects from the crank 66 to engage a pendant finger 68 mounted on the frame 30. By the mechanism described, the crank 66 moves the end 67 of the arm 65 to engage the lower end of the finger 68 as this crank approaches the outward extremity of its movement in such manner that the dog 64 is raised from engagement with the hammer 61. This permits the springs 63 to actuate the hammer sharply against the stud 60 which in turn actuates the several pins 59 through the plate 58 to eject a grid from the mold when the latter is in its fully open position indicated in dotted lines in Fig. 7. The finger 68 is pivoted so that it is free to swing to its dotted line position after tripping the hammer. Upon the return of the mold carriage to close the mold, the dog 64 is carried past the top of the hammer 61 and drops into engagement therewith. Subsequently, as the mold is opened, the arm 65 is moved faster than the mold carriage and hammer so that the dog 64 draws the hammer away from the stud 60 until the arm is again tripped by engagement of its end 67 with the finger 68 as hereinbefore described.

Automatic check mechanism and safety device

Upon the ejection of a casting, in the normal operation, it falls from the open mold to the chute 26, so that its lower edge rests on a pair of arms 70. The fall of the casting is checked and its lower edge is straightened on the arms 70 by a movable check plate 71 (Figs. 7 and 17). This plate is fastened to a pair of arms 72 having a pivotal support 73 on the frame. The arms 72 are connected by a link 74 to the arms 56 supporting the carriage 55, the link 74 being arranged to raise the plate 71 out of the path of the casting as the mold closes and to cause the lower edge of said plate to rest on the chute 26 when the mold is in open position. An elongated slot 74a in the link 74 is provided for engagement with a pin 74b connecting the arms 72 to the arms 56 to allow the plate 71 to dwell in its lower position (Fig. 17) while checking the fall of a casting.

Figure 5:
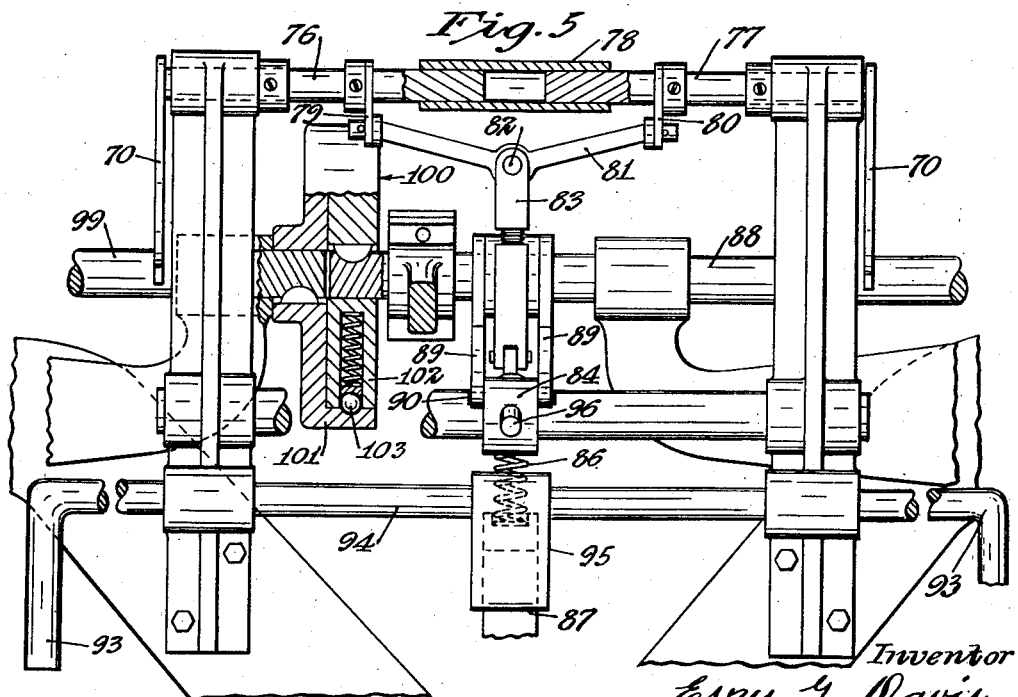
Fig. 5 is a fragmentary, part elevation and part section on a larger scale, showing the mechanism for arresting the operation of the metal pouring device, as seen from the left of Fig. 3.

The arms 70 are so connected to the pouring device that the operation of the latter is normally interrupted unless both of the arms are depressed, as by the weight of a properly positioned casting thereon. The mechanism for accomplishing this is best shown in Figs. 5, 7 and 10. As shown in Fig. 5 the arms 70 are fixed on the ends respectively of shafts 76 and 77, these shafts being disposed in alignment with each other and having suitable bearings in the frame and in a sleeve 78 engaging the adjacent ends of the shafts. Cranks 79 and 80 are secured to the shafts 76 and 77 respectively and are connected to opposite ends of a lever 81 pivoted at its central point on a pin 82 supporting it on the upper end of a substantially vertical link 83. This link is joined at its lower end to a lever 84 pivoted on a pin 85 (Figs. 7 and 10) and having one end supported on a spring 86. A bracket 87 projects from the machine frame to support the spring 86. A rock shaft 88 is operatively connected to the pouring device, as hereinafter described, and a pair of lugs 89 are rigidly fastened to the shaft to engage a stop pin 90 mounted on the lever 84. The pin 90 is guided for limited horizontal movement in a slot 91 formed in the lever 84 and is urged toward the pivot pin 85 by a spring 92 confined in a recess extending in from the end of the lever. As best shown in Fig. 5, a pair of the lugs 89 are provided on the shaft 88 to project at opposite sides of the lever 84 and engage the ends of the pin 90 which project from the lever.

When a casting falls to proper position on the arms 70 the lever 84 is moved down against the action of the spring 86 and carries the pin 90 out of the path of the lugs 89. This allows the shaft 88 to rock in the direction necessary for the pouring operation. If neither or one only of the arms 70 are depressed, the lever 84 is retained in its elevated position by the spring 86 so that the pin 90 stops the lugs 89 and further rocking movement of the shaft 88. In the case where only one of the arms 70 is depressed, the corresponding rocking movement of the shaft 76 or 77 tilts the lever 81 so that it merely pivots on the pin 82 without moving the lever 84 against the force exerted by the spring 86. In such case the pouring mechanism does not operate and it will be evident that both of the arms 70 are normally depressed only by a properly straightened casting which has been entirely ejected from the mold.

Manually operable means for rendering the safety device inoperative is also provided and comprises a lever 93 for turning a shaft 94 upon which is fixed a cam 95 (Figs. 5 and 7). The lever 93 may be duplicated at the back, as well as at the front or control side of the machine, as indicated in Fig. 5. The cam 95 is arranged to actuate an arm 96 which projects from the lever 84 beyond the shaft 85. The shaft 94 is merely turned to raise the arm 96 and thereby move the pin 90 out of the path of the lugs 89 when it is desired to render the safety device inoperative, as in starting the machine.

*Metal pouring mechanism*

To operate the metal pouring mechanism, I provide an eccentric 97 (Figs. 1, 6 and 12) on the shaft 35. This eccentric is so connected to a crank 98 fixed on a shaft 99 that the latter is normally oscillated through an angle of approximately 60 degrees. The shaft 99 is mounted in axial alignment with the shaft 88 and the adjoining ends of these shafts are operatively connected together by an overload clutch indicated generally by the numeral 100 and shown in detail in Figs. 5 and 11. The clutch comprises a hollow cylindrical member 101 fixed on the shaft 99, an inner member 102 fixed on the shaft 88 and a series of spring pressed balls 103 carried by the member 102 and arranged to engage in shallow recesses in the member 101. The balls 103 are spaced 120 degrees apart in radially disposed recesses each of which contains a spring for pressing the ball into a recess in the member 101, the radii of the balls being greater than the depth of the recesses. This clutch allows the shaft 99 to continue its oscillating movement when the shaft 88 is stopped by engagement of the lugs 89 with the pin 90.

As best shown in Figs. 3 and 6, the shaft 88 projects from the control side of the machine and has a sprocket wheel 104 secured thereto to drive a chain 105 trained on a smaller sprocket wheel 106. The latter is secured to a rock shaft 107 to oscillate the same through an angle of approximately 165 degrees, as indicated in Fig. 8. The shaft 107 has a bearing 108 in an auxiliary frame member 109 secured to the lead pot 20. Secured to an end of the shaft 107 is an arm 110 which is pivotally connected to a hanger member 111 for supporting the ladle 21. Another hanger member 112 is suspended in spaced parallel relation to the member 111 on cross rods 113 and 114. To support the latter rod, a pair of arms 115 are pivotally connected thereto and are fixed on a supporting shaft 116 which is free to oscillate in bearings in the upper end of the frame member 109 and in a parallel frame member 117 (Fig. 6). The shaft 116 has an arm 118 rigidly secured thereto and this arm carries a counterweight 119 adapted to be adjusted thereon to compensate for the load carried by the hanger arms 111 and 112.

The ladle 21 has pivot pins 120 connecting its ends to the hanger members 111 and 112 respectively and is adapted to be tilted at the end of its feeding stroke by engagement with a pin 121 projecting from an adjustable support 122. This support is pivotally mounted on a bracket 123 (Fig. 6) to permit adjustment of the pin 121 to engage ladles 21 of various lengths corresponding to the lengths of the grids to be poured. By the mechanism described, the ladle 21 is oscillated between its dotted and full line positions shown in Fig. 8. It will be understood that when in the dotted line position the ladle is submerged in molten metal in the pot 20 to receive the metal required for one casting and then is raised and swung toward the mold until the ladle strikes the pin 121 which tilts it and empties the charge into the opening in the top of the mold, as indicated in full lines in Fig. 8. The length of ladle is substantially equal to the width of the casting, horizontally, and the metal flows from the discharge side of the ladle in a correspondingly wide stream of uniform depth so that there is a quick, direct and uniform transfer of metal for the several castings.

The pouring operation is stopped with the ladle 21 above the lead pot when oscillation of the shaft 88 is interrupted by engagement of the lugs 89 with the pin 90. Thereafter, continued oscillation of the shaft 99 causes the overload clutch 100 to release the shaft 88. As the oscillation of the shaft 99 is of smaller amplitude than the angular distance between adjacent balls 103, the timing of the pouring operation cannot get out of proper synchronism with the opening and closing of the mold.

Grid conveying and collecting mechanism

As best shown in Figs. 6, 7 and 9, each of the conveyor chains 28 is trained on sprocket wheels 124, 125 and 126. The sprocket wheels 124 are secured to a drive shaft 127 which is driven by a small sprocket wheel 128. A chain 129 drives the sprocket wheel 128 and is driven by a sprocket wheel 130 fixed on the shaft 35 (Figs. 6, 7 and 14).

The sprocket wheels 125 are freely revoluble on a shaft 131 which may be turned in bearings in the frame (see Figs. 6 and 9). Threads are formed on the shaft 131 to engage threaded sleeves 132 having cylindrical outer surfaces on which the sprocket wheels 125 are free to rotate. The threads on the shaft 131 at their opposite ends are respectively right and left hand so that when said shaft is turned in the frame it moves the sleeves 132 carrying the sprocket wheels 125 to or from each other to thereby adjust the spacing of the chains 28 carrying the lugs 27 (Fig. 9). Knurled heads 133 are fixed on the ends of the shaft 131 to facilitate turning.

The rails 29 are also made adjustable transversely by supporting them on guide plates 134 suspended from the threaded sleeves 132 and shaft 127, hanger bars 135 being provided for this purpose. The driving sprocket wheels 124 are secured to the shaft 127 by set screws which may be loosened to permit sliding adjustment of these wheels to or from each other along the shaft 127.

As shown in Fig. 9, the fingers 27 project between and are guarded by the rails 29 and plates 134 and the castings are positively advanced along the rails 129 and between the plates 134 at opposite sides of the machine respectively. By this arrangement, I insure positive clearing of the passage leading away from the mold even in cases where the castings tend to jam or become caught. My arrangement of downwardly projecting fingers 27 and chains 28 moving along and near the chute 26 at the receiving end of the conveyor is an important feature of the conveying mechanism.

The sprocket wheels 126 are merely employed to retain the proper tension in the chains 28 and are freely revoluble on a shaft 136 (Figs. 6 and 7) which shaft is supported on coiled springs 137 near its ends respectively and held in spaced relation to the shaft 127 by bars 136a.

As will now be understood, a pair of the fingers 27 engages each casting to advance it along the rails 29. The castings are thus collected in a group, as indicated in Fig. 7, wherein they are suspended in vertical, parallel planes to which position they fall as soon as their trailing edges are free of the diverging chute 26. An attendant merely removes the grids from near the delivery end of the rails 29.

Controls and operation

As hereinbefore stated, the operation of opening and closing the mold is under control of the valve 44 which admits fluid under pressure to the cylinder 48 and also opens the exhaust passages to alternately communicate with opposite ends of the cylinder. A suitable arrangement of ports and closure member is shown in Figs. 18 and 19 in which the numeral 138 indicates the port in communication with the pipe 46, 139 is the port in communication with the pipe 47, 140 is the exhaust passage and 141 is a passage in communication with the fluid supply pipe 45. A cylindrical member 142 of the valve 44 is keyed to an end of the shaft 43 and is formed with a passage 141a in continuous communication with the passage 141. The member 142 is also formed with passages 143 and 144 adapted, when the member 142 is oscillated, to communicate respectively and alternately with the ports 138 and 139. A recess 140a in the member 142 is continuously in communication with the exhaust passage 140 and extends in an arc so that when the member 142 is oscillated the ports 138 and 139 are alternately placed in communication with the exhaust passage 140. The cylindrical member 142 is spaced from the valve casing, as shown in Fig. 19, to provide a chamber 141b supplied with fluid under pressure through the passages 141 and 141a. This chamber communicates with the passages 143 and 144.

The shaft 43 is rocked through a total angle of about 40 degrees or to and from positions 20 degrees in clockwise and counter-clockwise directions from the central position shown in Figs. 18 and 19. When moved clockwise from the illustrated position, the passage 143 supplies fluid under pressure from the chamber 141b to the pipe 46 through port 138 while fluid is exhausted through the pipe 47, port 139, recess 140a and passage 140. This closes the mold. When rocked 20 degrees in a counterclockwise direction from the illustrated position, fluid is supplied from the chamber 141b to the pipe 47, through the passage 144 and port 139, and fluid is simultaneously exhausted through the pipe 46, port 138, recess 140a and passage 140, to open the mold.

As shown in Figs. 6 and 15, the valve operating shaft 43 has secured thereto a head 145 carrying a dog 146 which engages a stop 147 to limit turning movement of the shaft in one direction. This dog and stop are mounted adjacent to the frame at the rear of the machine and near the opposite end of the shaft 43 a crank 148 is secured thereto. The outer end of this crank has a coiled spring 149 attached to it to press the dog 146 against the stop 147. An end of the spring 149 is attached to the frame, as shown in Fig. 7. Secured to the shaft 43 adjacent to the front of the frame is a head formed with a tooth 150 adapted to engage a shoulder on a lever 151. This lever is freely pivoted on a pin 152 attached to the frame of the machine in position to permit oscillating movement of the lever to and from engagement with the tooth 150. As hereinbefore described, the crank 42 is also secured to the shaft 43 and an end of the crank has a handle 153 projecting therefrom through an elongated slot 154 formed in the link 41. This link is oscillated through its connection with the disk 38 which rotates in a clockwise direction, as seen in Fig. 13. The pin 40 which connects the link 41 to the plate 38 projects into the elongated slot 39 formed in the periphery of the head 37 to permit limited rotary motion of the plate 38 relative to the head.

In the normal operation of the valve, the spring 149 tends to hold the valve in such position as to cause the mold member 23 to be held in closed position, with the dog 146 engaging the stop bar 147. When the valve is in this position the crank 42 is in its dotted line position indicated by the numeral 42a in Fig. 13. When the mold member 23 is in its open position, the crank 42 may be in either the full line position shown in Fig. 13 or in the dotted line position 42b, depending on whether the crank is actuated manually or by power applied to the link 41. Assuming that the mold is closed, the plate 38 rotating in a clockwise direction (Fig. 13) slides the link 41 obliquely downward relative to the handle 153 until the upper end of the slot 154 strikes the shank of the handle. Further downward movement of the link 41 actuates the handle and crank 42 until the latter reaches its dotted line position 42b. This opens the mold and the ejecting mechanism operates to remove the casting from the mold, whereupon continued rotation of the head 37 actuates the plate 38, by means of the pin 40, to and across the dead center position at the lower extremity of the stroke of the link 41. When the handle 153 passes this position the spring 149 actuates the valve 44 to close the mold quickly while the pin 40 moves freely in the recess 39 in the head 37 and the crank 42 carrying the handle 153 is actuated to its dotted line position 42a. During the succeeding portion of each cycle of rotation of the head 37 the crank 42 remains stationary while the link 41 idles or slides relative to the shank of the handle 153. The slot 154 permits this idling motion until the link 41 again reaches the point in its downward path where the upper end of the slot 154 engages the shank of the handle 153.

In preparing the machine for operation it is desirable to retain the mold in open position and it is also important in an emergency to facilitate the quick opening of the mold. In either case, the operator merely thrusts the handle 153 downward to its full line position shown in Fig. 13, whereupon the shoulder on the lever 151 drops into engagement with the dog 150 to lock the valve in such position as to hold the mold open. It will be evident that when the mold is thus opened manually the handle 153 is moved downward to a position slightly below that to which it is actuated in the normal operation of the machine so that during the latter the locking lever 151 does not drop into engagement with the dog 150. To unlock the mold, the free end of the lever 151 is merely raised. Thereafter the motor driven shaft 35 actuates the valve 44, through the connections described, in timed relation to the casting conveyor and as this valve controls the movement of the mold to and from closed position the several mechanisms are operated in proper synchronism with each other.

In the normal operation of the machine, a casting falls on the arms 70 so as to actuate the lever 84 to withdraw the pin 90 from the path of the lugs 89. This allows the pouring device to deliver the molten metal for the next casting after the closing of the mold. The spring 92 allows the pin 90 to move in the slot 91 under the impact of the lugs 89 in the event of the stopping of the pouring device. By this detail of construction a brief interval of time is allowed for positioning of the casting on the arms 70 so that the operation of the machine is not interrupted due to slight delays of this kind.

To protect the machine against breakage in case of obstruction of any of the moving parts, I provide an over-load clutch 155 in all respects similar to the clutch 100 but located at the junction of the shaft 35 with the speed reducing gears in the casing 36 (Figs. 2 and 6).

As best shown in Figs. 1 and 2, the pulley 156 which drives the belt 33 is of the type described in Patent No. 2,050,358 dated August 11, 1936 having spring pressed, conical members engaging opposite side edges of the belt 33 so that the belt may be adjusted to and from the axis of the motor shaft, merely by changing the tension on the belt, to change the driving speed or ratio. The motor 32 is secured by suitable brackets to a vertical shaft 157 and this shaft has a threaded portion 158 engaging a nut 159 so that by turning the shaft the position of the motor may be adjusted to vary the tension on the belt 33 and corresponding driving ratio for the driven pulley 34. To facilitate turning the shaft 157 a manually operable crank 160 is formed on the upper end thereof. The rate of operation of the machine may thus be varied between the limits required for allowing grids of various sizes to solidify in the mold.

The electric motor 32 is connected in electric circuits which include a pair of switches 161 having push buttons located within convenient reach of an operator positioned at either the front or back of the machine. A manual control valve 162 for the cylinder 48 is provided to facilitate adjustments of the machine in preparing it for automatic operation. A lubricant is fed to the cylinder 48 by a suitable pump device 163.

Having described my invention, what I claim as new and desire to protect by Letters Patent is:

1. In a casting machine having a mold adapted to be opened for the removal of the castings and a valve for controlling the opening and closing of said mold, the combination of a rock shaft for operating said valve, a crank on said shaft, a link operatively connected to said crank, a power-driven, rotary shaft, means connecting said link to said last mentioned shaft and permitting limited rotation of said shaft relative to said link and spring means for rocking said first mentioned shaft and actuating said crank and link relative to said power-driven shaft.

2. In a casting machine having a mold adapted to be opened for the removal of the castings and a valve for controlling the opening and closing of said mold, the combination of a rock shaft for operating said valve, a crank on said shaft, a link operatively connected to said crank, a power-driven, rotary shaft, means connecting said link to said last mentioned shaft and permitting limited rotation of said shaft relative to said link, spring means for rocking said first mentioned shaft in one direction and for actuating said crank and link relative to said power-driven shaft and manually operable means for locking said rock shaft in one position against movement by said spring means.

3. In a casting machine having relatively movable mold members adapted to be separated for the removal of the castings, a shaft, means for turning said shaft about its axis, a crank on said shaft, toggle members operatively connecting said crank to one of said mold members to actuate the same to and from closed position, said toggle members being disposed in substantial alignment with each other when the mold is closed, means for ejecting castings from said movable mold member when in open position, the improvement which comprises a second crank of greater length than said first mentioned crank fixed on said shaft and means operatively connecting said ejecting means to said second crank.

4. In a casting machine having relatively movable mold members adapted to be separated for the removal of the castings, a shaft, means for oscillating said shaft about its axis through an angle not to exceed 180 degrees, a crank on said shaft, toggle members operatively connecting said crank to one of said mold members to actuate the same to and from closed position, said toggle members being disposed in substantial alignment with each other when the mold is closed, means for ejecting castings from said mold, a spring-pressed hammer mounted on the mold for actuating said ejecting means, an arm for actuating said hammer, the improvement which comprises a second crank of greater length than said first mentioned crank fixed on said shaft and means operatively connecting said arm to said second crank whereby said arm is oscillated with greater amplitude than the hammer.

5. In a casting machine, a mold having relatively movable members, a receptacle positioned beneath said mold to receive the castings therefrom and a conveyor for removing the castings from said receptacle comprising a pair of conveyor chains mounted in spaced parallel relation to each other above said receptacle and each having fingers projecting downward to engage castings on the receptacle, means for slidably supporting the casting beneath said chains and power actuated means for driving said chains.

6. In a casting machine, a mold adapted to form castings with lugs projecting laterally therefrom, a receptacle positioned beneath said mold to receive the castings therefrom, a pair of rails spaced to suspend the castings by the lugs thereon and a conveyor for removing the castings from said receptacle, along said rails comprising a pair of chains mounted in spaced parallel relation to each other above said receptacle and each having fingers projecting downward to engage the casting lugs, said fingers being movable along said rails.

7. In a casting machine, a mold adapted to form castings with lugs projecting laterally therefrom, a chute positioned beneath said mold to receive the castings therefrom, means for straightening the castings on said chute, a pair of rails spaced to suspend the castings by the lugs thereon and a conveyor for removing the castings from said chute along said rails comprising a pair of chains mounted in spaced parallel relation to each other above said chute and each having fingers projecting downward to engage the casting lugs on the chute, said fingers being movable along said rails and said chute being formed to diverge downward from the rails toward the delivery end of the machine.

8. In a casting machine a mold adapted to form castings having lugs projecting laterally therefrom, a chute positioned beneath said mold to receive the castings therefrom, means for checking and straightening the castings on said chute, rails extending along the side edges of said chute to support the lugs of the castings and a conveyor for moving the castings along said rails comprising, a pair of conveyor chains mounted in spaced parallel relation to each other above said chute and each having fingers projecting downward to engage casting lugs, said fingers being movable along the rails and the casting lugs being confined against upward movement by the chains above the rails.

9. In a casting machine relatively movable mold members, means for actuating one of said members to and from closed position, means for ejecting castings from said mold when in open position, a receptacle beneath said mold for receiving the ejected castings, the combination of power-actuated means for pouring measured quantities of molten metal into said mold when in closed position and controlling mechanism for said pouring means having a member projecting into the path of castings in said receptacle whereby the operation of said pouring means is interrupted upon failure of a casting to engage said controlling member.

10. In a casting machine a mold, means for opening and closing the mold, means for ejecting castings from the mold when in open position, means for pouring measured quantities of molten metal into said mold when closed and means connecting said mold-operating, ejecting and pouring means together for operation in timed relation to each other in a predetermined cycle, the improvements in controlling mechanism for said pouring means comprising a stop normally operative at a predetermined point in said cycle to arrest said pouring means, a control member projecting into the path of the ejected castings to be actuated thereby and means connecting said member to said stop to render the latter inoperative periodically.

11. In a casting machine a mold, means for opening and closing the mold, means for ejecting castings from the mold when in open position, means for pouring measured quantities of molten metal into said mold when closed and means connecting said mold-operating, ejecting and pouring means together for operation in timed relation to each other in a predetermined cycle, the improvements in controlling mechanism for said pouring means comprising a stop normally operative at a predetermined point in said cycle, a plurality of spaced members projecting into the path of the ejected castings and arranged to be actuated thereby and means connecting said members to said stop to render the latter inoperative periodically.

12. In a casting machine having relatively movable mold members, and a receptacle beneath said mold for receiving the castings, the combination of means for pouring measured quantities of molten metal into said mold when closed, a power drive for said pouring means, stopping means for said drive, a pair of spaced and movable control members projecting into the path of castings in said receptacle and means connecting said members to said stopping means to render the latter inoperative upon engagement of a casting with both of said members.

13. In an automatic casting machine having a mold adapted to be opened for the removal of the castings and a valve controlling the opening and closing of said mold, the combination of spring means for actuating said valve to close the mold, power-driven means for actuating said valve to open the mold at regularly recurring intervals and release means operable at regularly recurring intervals when the mold is open to release said spring instantaneously and thereby cause the closing of the mold with a relatively quick movement as compared with the rate of opening the mold.

14. The improvements in a casting machine having a mold adapted to be opened for the removal of the castings, a power-driven shaft, means operable by said shaft for controlling the opening and closing of said mold and means for ejecting castings from said mold when in open position, which comprise a rock shaft, means for oscillating said rock shaft connected to said first mentioned shaft, a pouring device for supplying measured quantities of metal to said mold, means connecting said pouring device to said rock shaft, a movable control member projecting into the path of the ejected castings and positioned beneath said mold and means for stopping the oscillation of said rock shaft under control of said movable member.

15. In a casting machine having a mold formed with a horizontally elongated opening to receive molten metal, a container of molten metal and means for supplying measured quantities of molten metal to said mold opening comprising, a horizontally elongated ladle, spaced, parallel carrier arms, pivotally supporting said ladle between them and pivoted to oscillate in vertical planes, the free ends of said arms being movable with the ladle into the metal in said container, said ladle being normally retained in upright position independently of the angular positions of said arms, means for actuating said arms to alternately submerge the ladle in said container and then carry the ladle laterally to a position above and in spaced, parallel relation to said opening and trip means for tilting said ladle relative to said arms to empty the contents into said mold opening.

16. In a casting machine having a mold formed with a top opening to receive molten metal, a container of molten metal adjacent to said mold and means for supplying measured quantities of molten metal to said mold opening comprising, a horizontally extending ladle, a bracket projecting above said container and mold, a hanger pivotally suspended from said bracket, means pivotally connecting said ladle to the lower end portion of said hanger, said ladle being normally retained in upright position by gravity independently of the position of said hanger, means for guiding said hanger to alternately submerge the ladle in said container and then carry the ladle to a position above and in spaced, parallel relation to said opening, trip means for tilting said ladle relative to said hanger to empty the contents into said mold opening and power-driven means for oscillating said hanger to and from said mold and container.

ESPY G. DAVIS.